Oct. 16, 1962    S. C. WERNHAM ET AL    3,058,256
PRE-BAITED TRAP
Filed Nov. 4, 1960
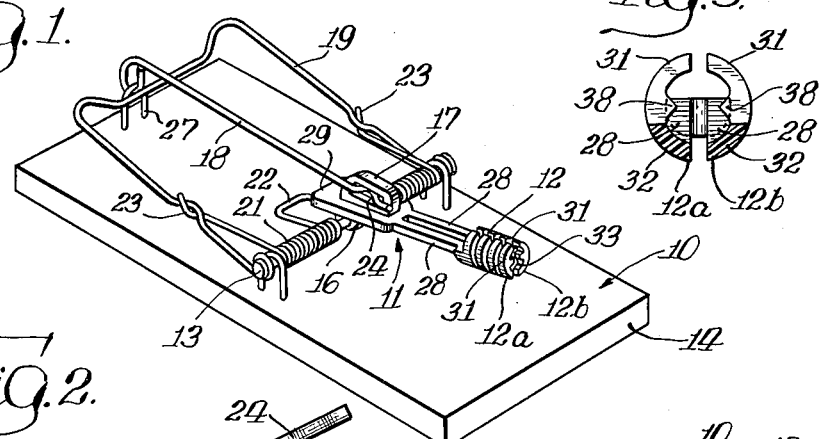
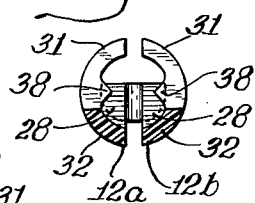
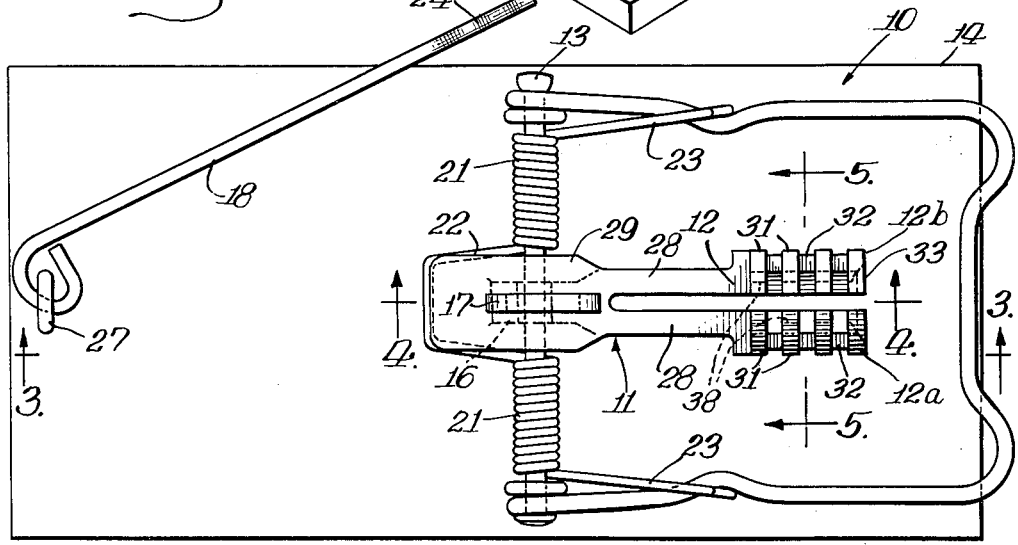
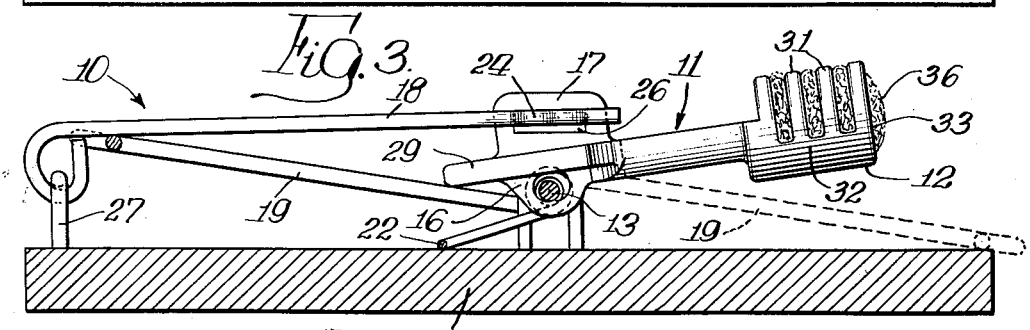
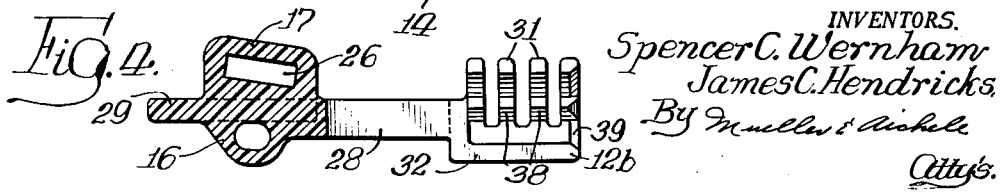
INVENTORS.
Spencer C. Wernham
James C. Hendricks
By Mueller & Aichele
Atty's.

3,058,256
PRE-BAITED TRAP
Spencer C. Wernham and James C. Hendricks, Marengo, Ill., assignors to McGill Metal Products Company, Marengo, Ill., a corporation of Illinois
Filed Nov. 4, 1960, Ser. No. 67,352
5 Claims. (Cl. 43—81)

This invention relates generally to animal traps. In particular, the invention is directed to a trigger structure for use in rodent traps and which has a built-in scent or odor providing a lure for attracting rodents.

Rodent traps which are commercially available at the present time generally include an element which serves as a bait holder and triggering device arranged so that if the bait is properly applied, the trap is sprung when an animal attacks the bait. Special baits which are highly attractive to mice, for example, are commercially available, but the ordinary user is likely to bait the trap with something ordinarily found in the home such as cheese, bread or the like. The bait holder of the trap usually has a tongue or projection to which the bait may be secured, but if the bait is not mounted properly, a rodent may be able to take the bait or some part of it without tripping the trap. If hard bait such as a peanut is employed, it may be necessary to tie it to the bait holder in order to make sure that the trap will be actuated if the bait is disturbed. Some users find it inconvenient and even difficult to apply bait to such traps in the manner required for the best results, and as a consequence traps are often baited improperly and the results are poor.

Accordingly, it is an object of the present invention to provide a trigger structure for an animal trap which has a long lasting built-in bait or lure so that it is not necessary to apply an expendable bait material to the trap.

Another object of the invention is to provide a trigger structure which in itself has an odor that is highly attractive to animals to be trapped, and in addition has provisions for holding expendable bait material, thereby providing an improved combination of lure and bait.

Another object of the invention is to provide a combination bait holder and trigger structure which is constructed so that bait material may be applied to it easily and quickly in a manner such that there is little or no chance for an animal to attack the bait without actuating the trap.

A feature of the invention is the provision of a pre-baited trigger structure for an animal trap which is impregnated with aromatic material which imparts to the trigger a long lasting odor that is highly attractive to the animals to be trapped.

Another feature of the invention is the provision of a plastic trigger member for a trap which has resilient jaws forming a receptacle for receiving bait and arranged such that when bait material is inserted between the jaws they retain it firmly in place.

A still further feature of the invention is the provision of a trigger and bait holder member for animal traps which is made of plastic material having aromatic material compounded within it, and which has jaws of an open ribbed construction for holding bait material, the ribs providing relatively large surface area for odor to travel from the plastic material and further providing for cross migration of such odor and the odors from the bait material held between the jaws.

The invention is illustrated in the accompanying drawings in which

FIG. 1 is a perspective view of a mouse trap provided with a plastic trigger structure which has aromatic material compounded within it in accordance with the invention, the trap being shown in a set condition;

FIG. 2 is a plan view of the trap of FIG. 1 in a tripped condition, and showing in particular the ribbed jaws of the trigger for receiving expendable bait;

FIG. 3 is an elevational view of the trap of FIG. 1 with the striker of the trap shown in a set position in full lines and in a tripped position in dotted lines, and also showing soft bait material received in the jaws of the bait holder portion of the trigger;

FIG. 4 is a longitudinal sectional view of the trigger member taken along the line 4—4 of FIG. 2 showing the interior of one of the jaws; and FIG. 5 is a cross-sectional view of the trigger member taken along line 5—5 of FIG. 2 which further illustrates the construction of the jaws.

The illustrated embodiment of the invention is a rodent trap provided with a trigger structure which has a semi-permanent odor that is highly attractive to rodents. The trigger is preferably made of molded plastic material impregnated with aromatic organic compounds which impart the desired odor to the trigger and provide long lasting lure qualities. The odor of the aromatic materials is sufficiently attractive to rodents that it is not essential to apply other bait to the trap. However, when bait is applied, the result is an unusual combination of built-in lure and expendable bait which has been found to be highly effective.

The trigger is provided with a bait holder portion which is adapted to receive and hold any of the various kinds of bait that are ordinarily employed in rodent traps. The bait holder portion preferably has a pair of jaws which form a split tubular receptacle into which bait can be readily inserted. The jaws have spaced ribs so that the receptacle is somewhat like a cage. Soft bait which is pressed into the receptacle will extrude between the ribs so that the bait is exposed sufficiently to attract rodents, but is not accessible to them. The jaws may be spread apart to accept pieces of bait larger than the initial size of the receptacle, and due to the resiliency of the plastic, the jaws clamp such bait holding it securely between them. Teeth or projections may be provided on the interior of the jaws for increased bait retention, and the portions of the jaws at the open end of the receptacle may be tapered inwardly so as to accept bait more readily. The aromatic material may be compounded with the plastic during the molding of the trigger, and the preferred plastic materials have a porous granular structure which allows odors to escape from within the plastic while maintaining the aromatic compounds in effective condition for a long time—perhaps several years. The ribs on the trigger provide large exposed surfaces from which the odor may escape.

Referring now to the drawings, FIGS. 1, 2 and 3 illustrate a mousetrap provided with a scented plastic trigger member 11 having a bait holder portion 12 with a pair of jaws 12a and 12b in accordance with the invention. FIGS. 4 and 5 further illustrate the construction of the trigger member.

The trigger member 11 is pivotally mounted on a cross-pin 13 which is secured to a wooden mounting base 14. The trigger has an integral pivot portion 16 in the form of a loop or eyelet through which the cross-pin 13 extends. The trigger member 11 further has an integrally formed latch portion 17 which cooperates with a conventional latching tongue 18 to hold a trap striker 19 in a set position as shown in FIGS. 1 and 3, and to release the striker when the trigger is disturbed.

The striker 19 is driven by a coil spring 21 positioned about the cross-pin 13. The spring has a central portion 22 abutting against the base 14 and portions 23 at opposite ends of the spring engage the striker for applying spring tension to it. The latching tongue 18 has a bent portion 24 at one end which seats in an opening 26 through the latch portion 17 of the trigger member. When the trigger is disturbed, even very slightly, the bent portion 24 of the tongue 18 slips out of the latch portion 17 releasing the striker 19 which is then driven by the spring 21 to its actuated position as shown in full lines in FIG. 2 and in dotted lines in FIG. 3.

The jaws 12a and 12b form the bait holder portion 12 of the trigger member 11 as previously mentioned. The two jaws 12a and 12b have respective arm portions 28 which extend in substantially parallel relation from the base or hub 29 of the trigger member. At the free end at each of the jaws there are a plurality of circular or curved ribs 31 extending from longitudinally extending connecting portions 32 which are integral with the two arms 28. The curved ribs 31 and the connecting portions 32 form a cage-like receptacle which has an opening 33 at one end into which bait can be inserted between the jaws. The receptacle has an overall tubular shape due to the circular curvature of the ribs and connecting portions as shown best in FIG. 5, and it will readily accept any of the baits ordinarily used in rodent traps such as peanuts, bread, cheese, bacon, and other materials.

FIG. 3 shows the manner in which soft bait such as soft cheese is held by the jaws 12a and 12b of the trigger member 11. The bait material 36 can be pressed into the receptacle formed by the jaws through the opening 33, and as the receptacle is filled up, the soft bait will extrude between the ribs 31. After any surplus bait is wiped away from the outer surface of the ribs 31, the bait is level or flush with the outer surface of the ribs and is exposed between the ribs so that odor can travel freely from the bait to provide effective attraction for rodents.

It should be noted that although the bait is exposed between the ribs as shown in FIG. 3, it is actually protected by the ribs 31 so that if it is attacked by a mouse for example, the trigger member will be disturbed sufficiently to release the striker member 19. In other words, the bait is not accessible to the mouse, and it cannot be materially disturbed without actuating the trap.

The bait holder 12 will also readily accept hard baits such as peanuts, and the jaws 12a and 12b provide clamping action to hold such baits firmly in place within the receptacle formed therein. The interior diameter of the tubular receptacle formed by the jaws is smaller than an ordinary peanut, so that when such bait is inserted into the opening 33 the jaws are spread apart. The plastic material of which the trigger member is made is highly resilient, and therefore the jaws apply resilient pressure to the nut or other bait so as to hold it securely in place. Each of the jaws 12a and 12b may also be provided with small teeth or projections 38 on the interior thereof as shown best in FIGS. 4 and 5, and these teeth help to retain the bait in the bait holder. The ends of the jaws at the opening 33 may be tapered inwardly slightly to form a beveled edge 39 which helps to guide the bait into the receptacle formed by the jaws while the bait is being inserted.

As previously mentioned, the entire trigger member 11 is made of molded plastic material, and the plastic has aromatic material impregnated or dispersed within it. The impregnation of the plastic with aromatic materials is achieved by mixing the aromatic material with plastic molding powder from which the trigger members are molded. The aromatic materials may be composed of volatile oils and aromatic organic compounds which provide long lasting lure qualities. These materials provided as concentrated oils may be used to impregnate the plastic material. Suitable aromatic materials which are soluble in oil, water, alcohol or other materials may be used in liquid form. For example, water soluble liquid flavors designated "Flour Flavor MMP" and "Apple Flavor MMP" are commercially available from Flavor Corporation of America, Chicago, Illinois, and cherry, vanilla and chocolate flavors are available from Sindar Corporation, New York, New York, which are soluble in corn oil and peanut oil. Solid aromatic materials can also be used by compounding the material into the plastic molding material, and solid aromatic materials having cheese and anise flavors are available from Dodge and Olcott, Inc., New York, New York.

The plastic material should have certain physical properties in order to provide a commercially satisfactory trigger member. The plastic should have high resistance to fracture in order to withstand rough handling which can be expected during manufacture and use of the trap. The plastic should have the ability to return to its original shape after it is flexed, this property being known as memory. The reason that plastic with good memory qualities is required is that the jaws 12a and 12b are spread apart when pieces of bait larger than the space between the jaws are inserted, and the jaws should return to their original positions when the bait is removed. The plastic material should also have a porous granular structure which allows odors to migrate or escape from the aromatic material compounded within the plastic without rapidly dissipating the aromatic material itself. Several plastic materials have been employed with good success, and a material found to be highly satisfactory is cellulose acetate butyrate which is available commercially under the trademark Tenite II. Trigger members made of nylon plastic material have also provided good results.

From the foregoing description it is apparent that the combination trigger and bait holder structure of the invention has very significant advantages as compared to known trap triggers. By impregnating the trigger structure with aromatic materials, the trigger has an odor which is highly attractive to rodents, for example, and it is possible to use the trap without applying expendable bait to it. This is a real benefit to the user since the difficulties involved with applying bait to known traps are avoided, and with the built-in lure there is no way for a rodent to take bait, so the chance of the rodent springing the trap is reasonably good. However, bait material may be applied to the trigger if desired, and the combination of odors from the expendable bait and the odor from the materials compounded within the trigger itself provides an unusual attraction for rodents which has been found to be highly effective.

The jaw type construction of the bait holder portion of the trigger makes it very easy to apply the bait, and the resiliency of the plastic jaws provides clamping action which insures that the bait is held firmly so that a rodent cannot attack the bait without actuating the trap. The entire trigger member including the bait holder portion, the pivot portion and the latching portion can be formed very economically by a plastic molding process, and the scenting of the trigger is accomplished economically during the molding operation.

We claim:

1. A trigger structure for use in a rodent trap comprising, a base having a pivot portion and a latching portion connected thereto, resilient jaw means of plastic material connected to said base including a pair of curved confronting jaw portions forming a substantially tubular receptacle with an opening at one end thereof for receiving expendable bait between said jaw portions, said jaw means having flavor material distributed in the plastic material thereof and imparting to said trigger structure an odor which is attractive to rodents, and said jaw portions having spaced rib elements for exposing bait material received therein and for protecting said bait material from attack by rodents, said jaw portions further having means projecting into the receptacle formed thereby for retaining bait material in said receptacle.

2. A pre-baited trigger structure for use in a rodent trap and comprising, an arm member of resilient plastic material impregnated throughout the same with aromatic organic material imparting to said arm member a scent which is attractive to rodents, said arm member having a pair of curved confronting jaw portions at one end thereof adapted to receive bait material between the same, said jaw portion being expandable with respect to each other and adapted to apply resilient pressure to bait material received therebetween, each of said jaw portions including a longitudinally extending connecting section and a pluraltiy of curved ribs extending in spaced parallel relation from said connecting section so that said jaw portions together form a cage-like receptacle, said receptacle having an opening therein for receiving bait material, and said arm member further having a pivot portion with an aperture therethrough for providing pivotal mounting of said arm member in a trap, and a latch portion with an aperture therethrough for cooperation with a latch in a trap.

3. A trigger structure for use in a rodent trap and comprising, an arm member of resilient plastic material, said arm member having a pair of curved confronting jaw portions at one end thereof adapted to receive bait material between the same, said jaw portion being expandable with respect to each other and adapted to apply resilient pressure to bait material received therebetween, each of said jaw portions including a longitudinally extending connecting section and a plurality of curved ribs extending in spaced parallel relation from said connecting section so that said jaw portions together form a cage-like receptacle, said receptacle having an opening therein for receiving bait material, and said arm member further having a pivot portion with an aperture therethrough for providing pivotal mounting of said arm member in a trap, and a latch portion with an aperture therethrough for cooperation with a latch in a trap.

4. In a rodent trap having a base and a spring loaded pivotally mounted jaw, a trigger mechanism which includes a pre-baited trigger comprising an elongated arm member of porous material impregnated throughout the same with aromatic organic material imparting to said arm member a semi-permanent odor providing a bait for rodents, said arm member having sufficient rigidity to serve as a trigger, means for pivotally mounting said arm member on the base of the trap, said trigger mechanism also including means engaging said arm member for establishing said arm member in a cocked position in which an end portion of said arm member is raised with respect to the base and accessible to rodents, said arm member further having means thereon for holding expendable bait material, so that said trigger is self-baited and is adapted to receive additional expendable bait.

5. The combination of claim 4 wherein said elongated arm member is molded of cellulose acetate butyrate material.

References Cited in the file of this patent

UNITED STATES PATENTS

| | | |
|---|---|---|
| 1,781,163 | Clarkson | Nov. 11, 1930 |
| 1,922,841 | Cooley | Aug. 15, 1933 |
| 2,002,095 | McCabe | May 21, 1935 |
| 2,222,653 | Chambless | Nov. 26, 1940 |
| 2,563,522 | Fisher | Aug. 7, 1951 |
| 2,702,443 | Bruske | Feb. 22, 1955 |